Feb. 22, 1938.   G. P. VINCENT   2,108,976
PRODUCTION OF CHLORINE DIOXIDE
Filed Aug. 15, 1934
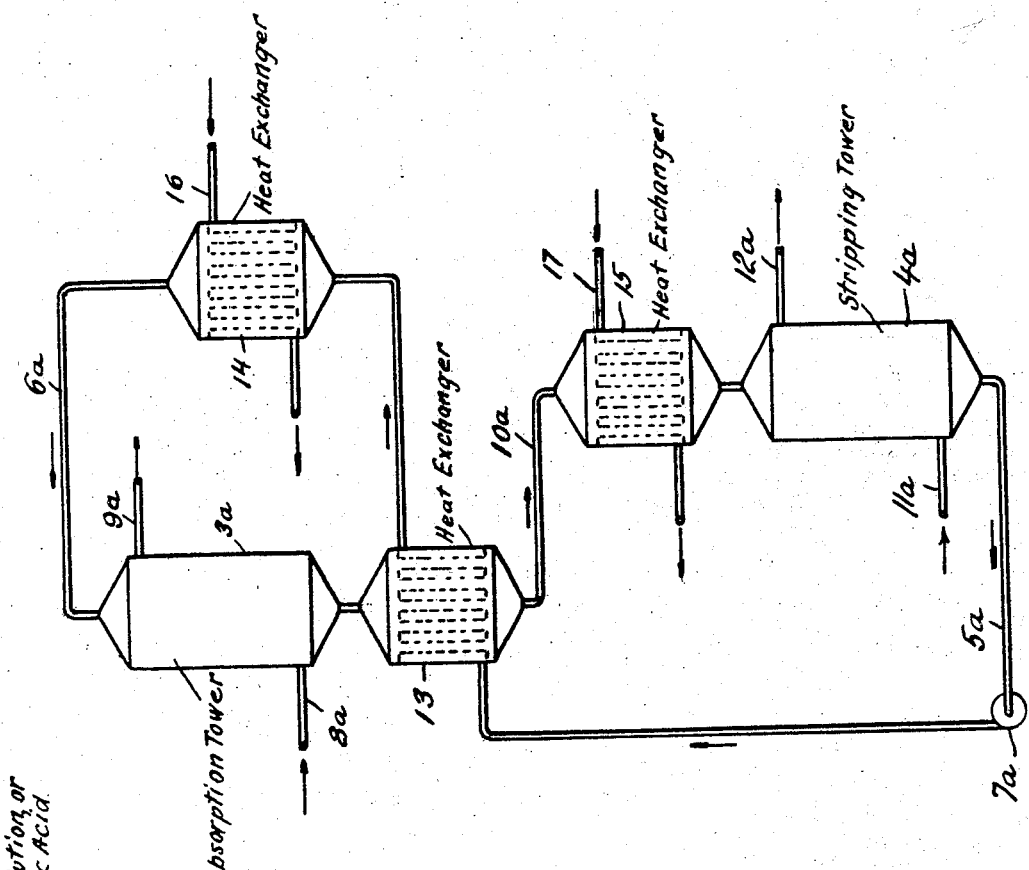
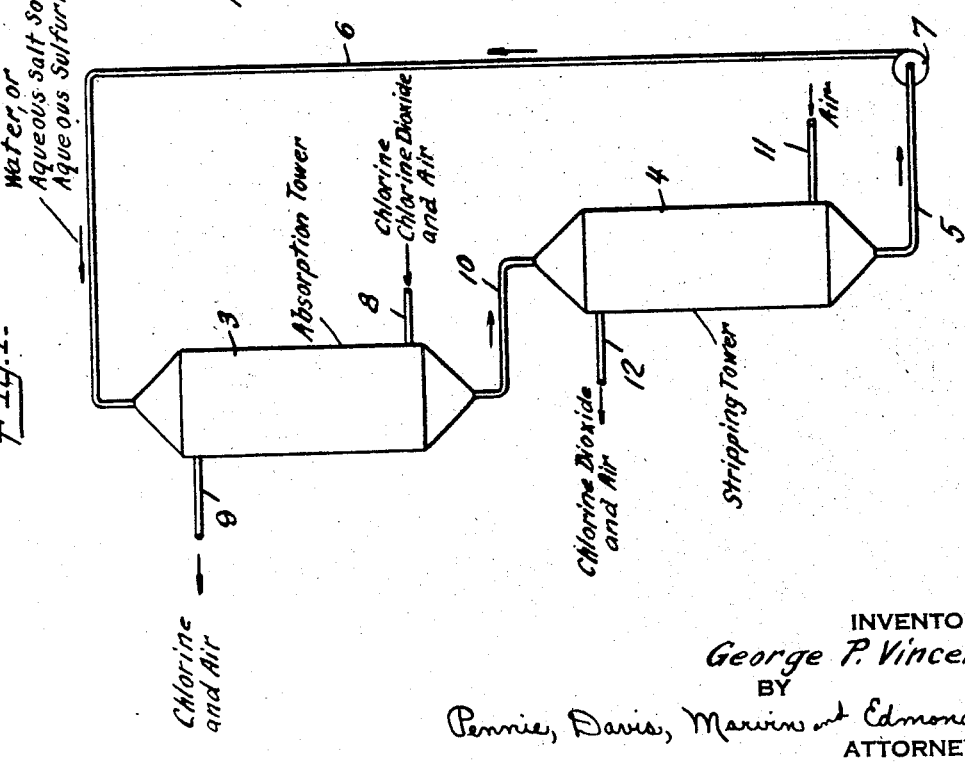
INVENTOR
George P. Vincent
BY
Pennie, Davis, Marvin & Edmonds
ATTORNEYS Patented Feb. 22, 1938

2,108,976

UNITED STATES PATENT OFFICE 2,108,976

PRODUCTION OF CHLORINE DIOXIDE

George Paul Vincent, Niagara Falls, N. Y., assignor to The Mathieson Alkali Works, Inc., New York, N. Y., a corporation of Virginia Application August 15, 1934, Serial No. 739,888

10 Claims. (Cl. 23—152)

This invention relates to improvements in the production of chlorine dioxide. More particularly, the invention relates to a method for selectively separating chlorine dioxide from a gas mixture including chlorine and chlorine dioxide, such as gas mixtures produced by reaction between chlorates and acids.

According to this invention, chlorine dioxide is separated from such gas mixtures by selective absorption of the chlorine dioxide in an aqueous medium chemically inert with respect to chlorine dioxide. Preferably the aqueous absorption medium is chemically inert with respect to both chlorine dioxide and chlorine. The absorption is with advantage carried out at low temperatures, between about 10° C. and the temperature at which the aqueous medium freezes. It may, however, be carried out at higher temperatures. By the use of the low temperatures, the volume of aqueous medium to be handled is reduced. While the use of a low temperature reduces the volume of aqueous medium to be handled and results in decreasing the cost of circulation and absorption, whether or not a low temperature should be used in making the separation will depend on whether the savings which can be effected by the use of a low temperature will be offset by the cost of producing the low temperature. In practical operation, therefore, the exact temperature to be used will depend on local conditions in regard to power, fuel and labor.

The aqueous media useful in carrying out the invention include water, aqueous solutions of salts chemically inert with respect to chlorine dioxide or mixtures of such salts, such as the chlorides and chlorates of sodium, calcium and magnesium, and aqueous sulfuric acid, advantageously of a concentration approximating 40%–96% $H_2SO_4$. While effective separations can be obtained using water as the absorption medium, solutions of salts chemically inert with respect to chlorine dioxide appear to be particularly advantageous. Effective separations can be obtained using aqueous sulfuric acid as the absorption medium but recovery of the absorbed chlorine dioxide from water or salt solutions is effected with greater ease. Completeness of separation of the chlorine dioxide from such gas mixtures is promoted by carrying out the absorption under conditions such that the partial pressure of the chlorine dioxide approximates 10–500 mm. of mercury or better 50–350 mm. of mercury in the gas mixture as supplied to the absorption zone. Following absorption, the absorbed chlorine dioxide can be recovered from the absorption medium by aeration, to recover the chlorine dioxide diluted with air, by heating the charged absorbent medium or by a combination of heating and aeration.

As previously noted, while the aqueous absorption medium need be chemically inert with respect to chlorine dioxide only, it is preferably chemically inert with respect to both chlorine dioxide and chlorine. The use of such a medium is advantageous, for example, in that the chlorine may be more readily recovered, its recovery cost being much less than in those cases where the chlorine reacts to any substantial extent with the absorption medium. Aqueous media chemically inert, as that term is used herein, with respect to both chlorine dioxide and chlorine include water, aqueous solutions or mixtures of the chlorides and chlorates of sodium, calcium and magnesium, and aqueous sulfuric acid, advantageously of a concentration approximating 40%–96% $H_2SO_4$.

In carrying out the invention, the aqueous absorption medium is with advantage maintained in cyclic circulation from a stripping zone to and through an absorption zone and back to the stripping zone, the gas mixture including chlorine and chlorine dioxide being contacted with the absorption medium in the absorption zone and the absorbed chlorine dioxide being stripped from the absorption medium in the stripping zone.

The invention will be further illustrated by the following examples of operations embodying the invention:

*Example 1.*—A gas mixture consisting of approximately equal proportions of chlorine and chlorine dioxide diluted with air to an extent such that the partial pressure of the chlorine dioxide approximated 200 mm. of mercury (at standard conditions) was scrubbed with water at a temperature just above 0° C. 92% of the chlorine dioxide originally present but only 14% of the chlorine originally present were absorbed by the water, the effluent gas mixture including 86% of the chlorine and only 8% of the chlorine dioxide originally present.

*Example 2.*—The same gas mixture was scrubbed with an aqueous solution of sodium chloride containing 26% (by weight) NaCl at a temperature of 0° C. 32 parts (by weight) of chlorine dioxide were absorbed by the saline absorption medium for every part of chlorine absorbed.

*Example 3.*—The same gas mixture was scrubbed with aqueous sulfuric acid containing, as supplied to the scrubbing operation, 76%

H₂SO₄ at a temperature of 3° C. 98% of the chlorine dioxide and substantially none of the chlorine originally present were absorbed by the absorption medium.

*Example 4.*—A gas mixture consisting of approximately equal proportions of chlorine and chlorine dioxide diluted with air to an extent that the partial pressure of the chlorine dioxide approximated 35 mm. of mercury (at standard conditions) was scrubbed with an aqueous solution of sodium chloride containing 26% (by weight) NaCl at a temperature of 24° C. The aqueous solution of sodium chloride containing absorbed chlorine dioxide was subjected to aeration and chlorine dioxide 93.9% pure with respect to chlorine obtained. If the gas mixture be cooled to about 3° C. before scrubbing with the aqueous salt solution and the resultant solution be heated, by means of steam or hot water, for example, to a temperature of 50° C. or 60° C. immediately prior to the stripping operation a greater yield of chlorine dioxide per unit of time can be obtained than where the operation is conducted as above.

The accompanying drawing illustrates, diagrammatically and conventionally, forms of apparatus appropriate for carrying out the invention. The apparatus illustrated in Figure 1 provides for recovery of absorbed chlorine dioxide by aeration of the absorption medium and the apparatus illustrated in Figure 2 provides for recovery of the absorbed chlorine dioxide by a combination of heating and aeration of the absorption medium.

Referring to Figure 1, the tower 3 is the absorption zone and the tower 4 is the stripping zone. These two towers may be of any conventional type promoting gas and liquid contact, for example they may be packed with distributing elements or they may be of so-called "bubble" tower construction. The stripped absorption medium from tower 4 is supplied to tower 3 through connections 5 and 6 by means of pump 7. The gas mixture, including chlorine and chlorine dioxide and diluting air for example, is supplied to tower 3 through connection 8. The gas mixture remaining after absorption of chlorine dioxide in tower 3 is discharged through connection 9. The absorption medium charged with absorbed chlorine dioxide is conveyed from tower 3 to tower 4 through connection 10. In tower 4 the charged absorption medium is stripped of absorbed chlorine dioxide by air supplied through connection 11. The recovered chlorine dioxide, in a mixture with the air supplied for aeration, is discharged from tower 4 through connection 12.

Referring to Figure 2, the same or corresponding parts are designated by the same reference characters used in Figure 1 with the letter "a" appended. The stripped absorption medium supplied from the tower 4a to the tower 3a by means of pump 7a is cooled, before entering the tower 3a, by passage successively through the heat exchangers 13 and 14. The absorption medium charged with chlorine dioxide flowing from tower 3a to tower 4a is heated by passage successively through the heat exchangers 13 and 15. In the heat exchanger 13 the charged absorption medium is heated and the stripped absorption medium is cooled by heat exchange between the two. A refrigerating medium, chilled brine for example, is supplied to heat exchanger 14 through connection 16 and a heating medium, steam for example, is supplied to heat exchanger 15 through connection 17.

I claim:

1. In the production of chlorine dioxide, the improvement which comprises separating chlorine dioxide from a gas mixture including chlorine and chlorine dioxide by selective absorption of the chlorine dioxide in aqueous sulfuric acid, and recovering chlorine dioxide from the absorption medium.

2. In the production of chlorine dioxide, the improvement which comprises separating chlorine dioxide from a gas mixture including chlorine and chlorine dioxide by selective absorption of the chlorine dioxide in aqueous sulfuric acid at a temperature below about 10° C., and recovering chlorine dioxide from the absorption medium.

3. In the production of chlorine dioxide, the improvement which comprises separating chlorine dioxide from a gas mixture including chlorine and chlorine dioxide by selective absorption of the chlorine dioxide in an aqueous solution containing a chloride and a chlorate of one or more elements of the group consisting of sodium, calcium and magnesium, and recovering chlorine dioxide from the absorption solution.

4. In the production of chlorine dioxide, the improvement which comprises separating chlorine dioxide from a gas mixture including chlorine and chlorine dioxide by selective absorption of the chlorine dioxide in an aqueous solution containing a chloride of an element of the group consisting of sodium, calcium and magnesium, and recovering chlorine dioxide from the absorption solution.

5. In the production of chlorine dioxide, the improvement which comprises separating chlorine dioxide from a gas mixture including chlorine and chlorine dioxide by selective absorption of the chlorine dioxide in an aqueous solution containing a chlorate of an element of the group consisting of sodium, calcium and magnesium, and recovering chlorine dioxide from the absorption solution.

6. In the production of chlorine dioxide, the improvement which comprises separating chlorine dioxide from a gas mixture including chlorine and chlorine dioxide by selective absorption of the chlorine dioxide in an aqueous solution containing a chloride and a chlorate of one or more elements of the group consisting of sodium, calcium and magnesium at a temperature below about 10° C., and recovering chlorine dioxide from the absorption solution.

7. In the production of chlorine dioxide, the improvement which comprises separating chlorine dioxide from a gas mixture including chlorine and chlorine dioxide by selective absorption of the chlorine dioxide in an aqueous solution containing a chloride of an element of the group consisting of sodium, calcium and magnesium at a temperature below about 10° C., and recovering chlorine dioxide from the absorption solution.

8. In the production of chlorine dioxide, the improvement which comprises separating chlorine dioxide from a gas mixture including chlorine and chlorine dioxide by selective absorption of the chlorine dioxide in an aqueous solution containing a chlorate of an element of the group consisting of sodium, calcium and magnesium at a temperature below about 10° C., and recovering chlorine dioxide from the absorption solution.

9. In the production of chlorine dioxide, the improvement which comprises separating chlorine dioxide from a gas mixture including chlorine and chlorine dioxide by selective absorption of the chlorine dioxide in an aqueous solution of a salt of one or more elements of the group consisting of sodium, calcium and magnesium, which salt is chemically inert with respect to chlorine dioxide and chlorine, and recovering chlorine dioxide from the absorption solution.

10. In the production of chlorine dioxide, the improvement which comprises separating chlorine dioxide from a gas mixture including chlorine and chlorine dioxide by selective absorption of the chlorine dioxide in an aqueous solution containing a material chemically inert with respect to chlorine and chlorine dioxide of the class consisting of sulphuric acid and salts of the elements of the group consisting of sodium, calcium and magnesium, and recovering chlorine dioxide from the absorption solution.

GEORGE PAUL VINCENT.